United States Patent [19]

Lockett et al.

[11] Patent Number: 4,479,264
[45] Date of Patent: Oct. 23, 1984

[54] TRANSDUCER FOR OPTICAL DATA TRANSMISSION

[75] Inventors: James F. Lockett, Missouri City; Jerry F. Janecka, Corpus Christi; Thomas O. Mehrkam, Houston, all of Tex.

[73] Assignee: Geosource Inc., Houston, Tex.

[21] Appl. No.: 371,951

[22] Filed: Apr. 26, 1982

[51] Int. Cl.³ .............................................. H04B 9/00
[52] U.S. Cl. ...................................... 455/605; 455/606
[58] Field of Search ................ 455/603, 604, 605, 606

[56] References Cited

U.S. PATENT DOCUMENTS 4,326,298  4/1982  Fromm .............................. 455/606
4,346,478  8/1982  Sichling .............................. 455/605

OTHER PUBLICATIONS

McGowan, "Multiple Pressure Transmitters Speak Digital on Two Wires", *Control Engineering*, Dec. 1979.
"Smoke Alarm Uses Fiber Optics for Hazardous Areas", *Electronic Design*, Sept. 3, 1981, at p. 64.

*Primary Examiner*—Howard W. Britton
*Attorney, Agent, or Firm*—Arnold, White & Durkee

[57] ABSTRACT

A transducer for optical data transmission is disclosed in which an optical signal is encoded with information representative of a parameter being measured and transmitted to a remote measurement and control apparatus site for decoding. An input optical signal is received by the transducer and separated into first and second portions. The first portion of the optical input signal is converted to electrical energy and is used to power the transducer. The second portion of the input optical signal is modulated in response to the measured parameter and the modulated signal transmitted back to the remote site.

10 Claims, 5 Drawing Figures

TRANSDUCER FOR OPTICAL DATA TRANSMISSION

CROSS REFERENCE TO RELATED APPLICATIONS

Passive Transducer Using Fiber Optics for Data Transmission, Ser. No. 371,830, filed on even date hereto, invented by James F. Lockett, Jerry F. Janecka, Thomas O. Mehrkam, William F. Wiseman and Robert L. Remels and assigned to the assignee of the present application; Transducer Apparatus Utilizing Fiber Optics for Data Transmission, Ser. No. 371,782, filed on even date hereto, invented by James F. Lockett, Miles A. Smither and Jerry F. Janecka and assigned to the assignee of the present application.

BACKGROUND OF THE INVENTION

This invention relates generally to transducers, and more particularly to a transducer which utilizes fiber optics for data transmission.

Physical parameters, such as temperature, pressure, force, stress, displacement, flow, and so forth, are utilized daily for monitor and control of processes. To monitor such parameters, transducers have generally been used to transform the parameter to be measured into an electrical signal, and the resulting electrical signal transmitted over electrical wires from the point of measurement to a second point at which measurement and control apparatus are located. And, in most instances, electrical power to operate the transducer is brought to the point of measurement from the measurement and control apparatus location over electrical wires.

Such systems, however, are susceptible to numerous problems when used in hostile or explosive environments. For example, the electrical wires used to transmit the electrical signal representative of the parameter from the transducer to the measurement and control apparatus location, and the electrical wires used to transmit electrical power to the transducer from the measurement and control apparatus location are susceptible to electromagnetic interference. Such electromagnetic interference can produce undesired impulses on the electrical wires which can result in transmission of incorrect data. Additionally, shorting due to insulation failure and the like can result in explosion caused by generation of an electric arc in the explosive environment, or by heating an element past the flash-point of the explosive environment.

SUMMARY OF THE INVENTION

According to a preferred embodiment of the present invention, an optical signal representative of the parameter to be measured is produced by the transducer, and the optical signal is then transmitted from the transducer to the remote measurement and control apparatus site. Electrical power may be supplied to the transducer by an optical input signal transmitted to the transducer from the remote site, thereby eliminating all electrical wire connections between the transducer and the remote measurement and control apparatus site.

According to one preferred embodiment of the invention, at least a portion of an input optical signal transmitted from the remote site to the transducer is used to generate electrical power for the transducer. The remaining portion of the optical signal is then modulated in a manner representative of the parameter being measured, and the modulated optical signal transmitted to the remote measurement and control apparatus site.

BRIEF DESCRIPTION OF THE DRAWINGS

The preferred embodiments of the present invention are described with reference to the accompanying drawings wherein like members bear like reference numerals, and wherein.

DESCRIPTION OF THE PREFERRED EMBODIMENTS

Figure 1:
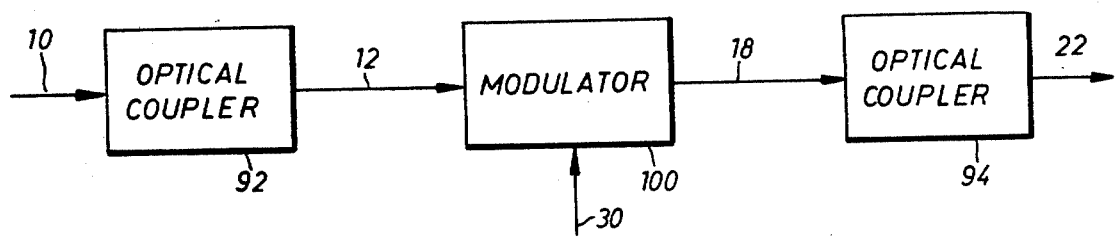
FIG. 1 is a block diagram of a transducer according to the present invention.

Referring to FIG. 1, a transducer apparatus includes an optical coupler 92 which receives an input optical signal 10 and transmits an optical signal 12. Modulator 100 receives optical signal 12 and generates modulated optical signal 18 in such a manner that the modulated optical signal is representative of a parameter 30 that is monitored by modulator 100. The modulated optical signal is received by optical coupler 94 which in turn transmits optical output signal 22 from the transducer.

Figure 2:
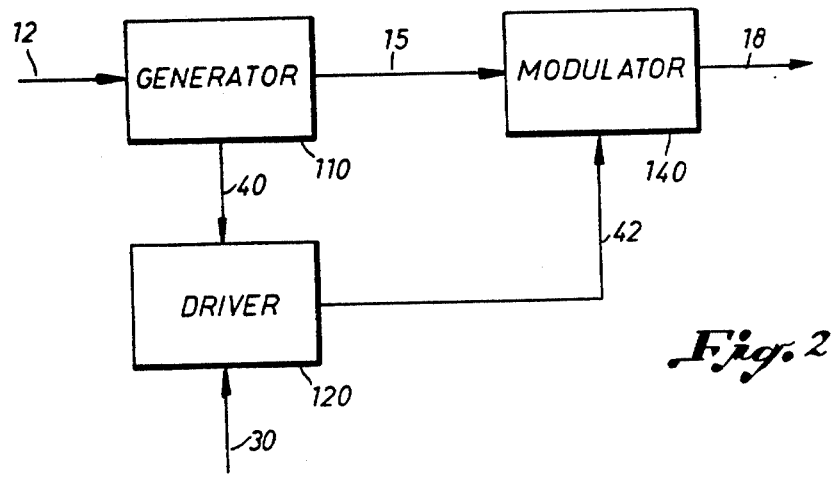
FIGS. 2, 3 and 5 are block diagrams of modulator elements for the transducer illustrated in FIG. 1.
Figure 3:
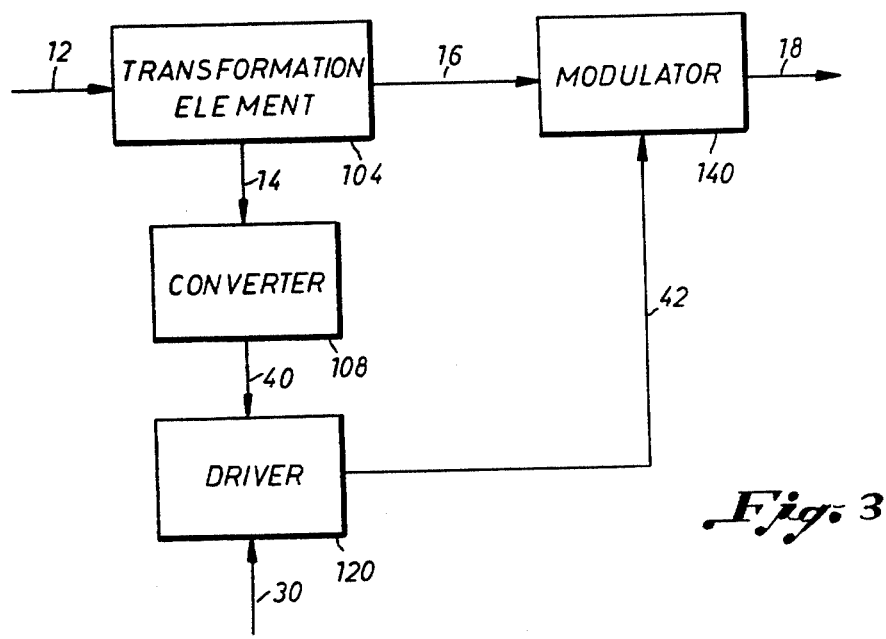
Figure 5:
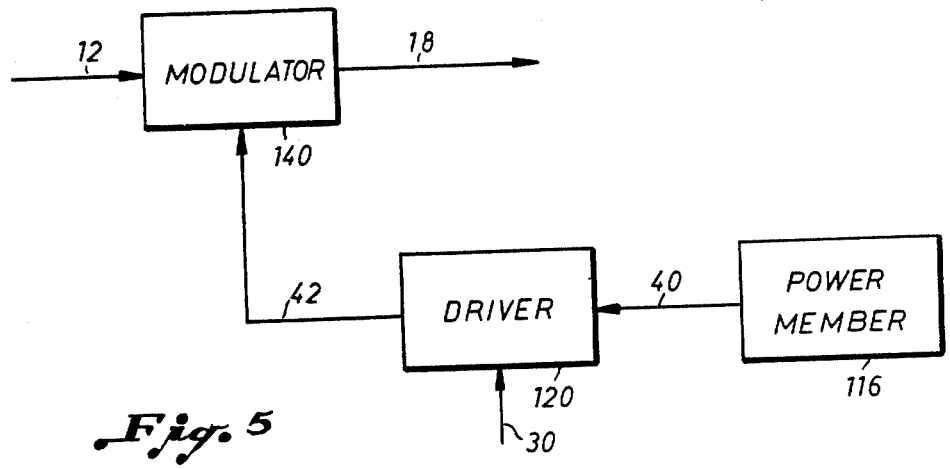

Preferably, modulator 100 is configured as illustrated in FIG. 2, FIG. 3, or FIG. 5. Referring to FIG. 2, optical signal 12 is received by generator 110, and at least a portion of that optical signal is used by the generator to produce a first electrical signal 40. The remaining portion of the optical signal 12, optical signal 15, is transmitted to and received by modulator 140.

The first electrical signal 40 is received by and provides electrical power to driver 120. Driver 120 monitors the parameter 30 and generates an electrical drive signal 42 representative of the parameter.

Modulator 140, which receives optical signal 15, is driven by electrical drive signal 42. So driven, optical signal 15 is modulated thereby producing modulated optical signal 18 which is representative of parameter 30.

Referring to FIG. 3, optical signal 12 is received by transformation element 104 which transforms optical signal 12 into a first optical signal 14 and a second optical signal 16. First optical signal 14 is received by converter 108 which converts the optical signal into a first electrical signal 40 which in turn is used to power driver 120. Driver 120 monitors parameter 30 and generates an electrical drive signal 42 representative of the parameter.

Modulator 140 receives second optical signal 16 and electrical drive signal 42. The second optical signal is modulated in accordance with electrical drive signal 42 so as to produce modulated optical signal 18 which is representative of parameter 30.

Generator 110 and converter 108 may each include photovoltaic cells which transform the respective optical signals received into electrical signals. Transformation element 104 may include a beam splitter as illustrated in FIG. 4.

Figure 4:
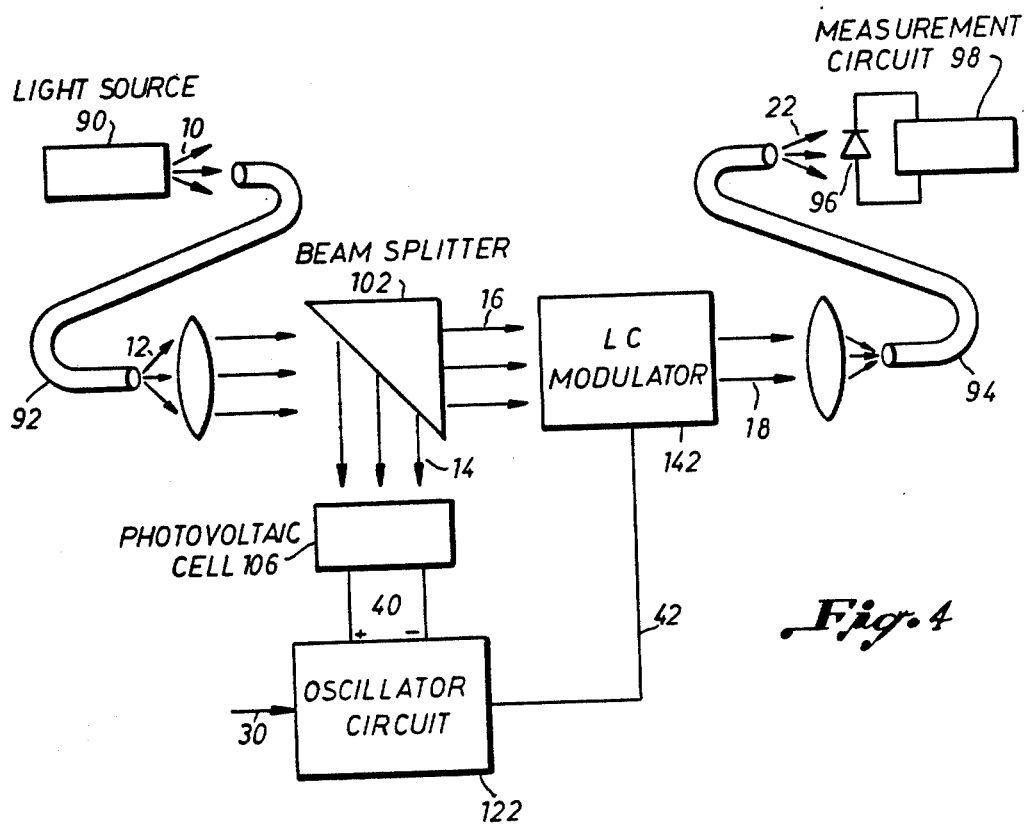
FIG. 4 is an illustration of a measurement system having a transducer with a modulator element as illustrated in FIG. 3.

Referring to FIG. 4, a measurement system is illustrated wherein light source 90, photodiode 96, and measurement circuit 98 are located at a remote measurement and control apparatus site. Optical fiber 92 receives an input optical signal 10 generated by the light source and transmits the optical signal to the transducer located at the site where the parameter is to be measured. The modulated optical signal 18 produced by the transducer is received by optical fiber 94 and transmitted to the remote site for measurement by photodiode 96 and measurement circuit 98.

Optical signal 12 is directed to beam splitter 102 which divides the optical signal 12 into a first optical signal 14 which is directed to a photovoltaic cell 106, and a second optical signal 16 which is directed to a liquid crystal modulator 142. Alternatively, optical signal 12 may be received by a pair of optical fibers, one of which transmits an optical signal to a photovoltaic cell, and the other of which transmits an optical signal to a liquid crystal modulator.

Photovoltaic cell 106 converts the first optical signal into a first electrical signal 40 which is used to power oscillator circuit 122. The oscillator circuit produces an electrical drive signal 42 whose frequency is dependent upon parameter 30.

Liquid crystal modulator 142 receives and modulates the second optical signal thereby producing modulated optical signal 18. The optical signal is modulated by varying the light transmission characteristics of the liquid crystal modulator. These characteristics are varied by electrical drive signal 42 and, therefore, are representative of parameter 30. The modulated signal is coupled to optical fiber 94 which delivers output optical signal 22 to the remote site for measurement.

Oscillator circuit 122 is preferably a variable frequency oscillator whose frequency of oscillation can be controlled by a circuit component such as a crystal, a resistance element, an inductive element, or a capacitive element in response to the parameter being measured. Any suitable oscillator circuit, for example, a complementary metal oxide semiconductor (CMOS) oscillator, may be included in oscillator circuit 122.

In another embodiment of the present invention a battery or other suitable electrical storage device may be included in the transducer thereby eliminating the need for converting any of the optical signal received by the transducer into a first electrical signal to power the transducer. The battery may advantageously be charged by a solar cell. Referring to FIG. 5, one such embodiment includes a battery or other suitable power member 116 which is self-contained at the location of the transducer and which produces the first electrical signal 40 used to power driver 120. Driver 120 monitors the parameter 30 and generates an electrical drive signal 42 representative of the parameter. Modulator 140, which receives optical signal 12, is driver by electrical drive signal 42. So driven, optical signal 12 is modulated thereby producing modulated optical signal 18 which is representative of parameter 30.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Moreover, variations and changes may be made by those skilled in the art without departing from the spirit of the present invention.

What is claimed is:

1. A transducer adapted to receive an input optical signal and responsive to a predetermined parameter which is to be measured, for modulating a portion of said input optical signal in a dependence of said parameter, said transducer comprising:
   first optical coupling means having a first end for receiving said input optical signal and a second end for transmitting said input optical signal;
   separating means optically connected to said second end of said first optical coupling means for receiving said input optical signal and for separating said input optical signal into first and second optical signals;
   conversion means for receiving said first optical signal and for generating an electrical power signal;
   driver means powered by said electrical power signal and response to said predetermined parameter, for generating an electrical drive signal representative of said predetermined parameter;
   modulation means connected to receive said electrical drive signal and said second optical signal, for modulating said second optical signal in dependence to said electrical drive signal to produce a modulated output optical signal; and
   second optical coupling means having a first end for receiving said modulated output optical signal and a second end for transmitting said modulated output optical signal.

2. The transducer according to claim 1 wherein the separating means and the conversion means comprise a photovoltaic cell.

3. The transducer according to claim 1 wherein the first and second optical coupling means each comprise an optical fiber.

4. The transducer according to claim 1 wherein the driver means comprises:
   oscillator circuit means having a selectively variable frequency of oscillation for producing a first oscillating signal; and
   frequency varying means responsive to the predetermined parameter for selectively varying the frequency of oscillation of said oscillator circuit means in response to said predetermined parameter.

5. The transducer according to claim 1 wherein the modulation means comprises a liquid crystal member, and further wherein the optical transmission of said liquid crystal member is varied in response to said electrical drive signal, whereby the optical transmission of the second optical signal through said liquid crystal member is varied in response to said electrical drive signal.

6. The transducer according to claim 1 wherein the separation means comprises a beam splitter member.

7. The transducer according to claim 1 wherein the separation means comprises first and second optical fibers.

8. The transducer according to claim 1 wherein the conversion means comprises a photovoltaic cell.

9. A transducer according to claim 1 wherein said conversion means includes an electrical storage device.

10. A transducer according to claim 9 further comprising means for charging said electrical storage device.

* * * * *